(12) United States Patent
Satou et al.

(10) Patent No.: US 7,308,961 B2
(45) Date of Patent: Dec. 18, 2007

(54) VEHICLE CRUISE CONTROL DEVICE AND METHOD

(75) Inventors: Shinya Satou, Hitachi (JP); Toshio Hori, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 227 days.

(21) Appl. No.: 10/386,548

(22) Filed: Mar. 13, 2003

(65) Prior Publication Data

US 2004/0040765 A1    Mar. 4, 2004

(30) Foreign Application Priority Data

Aug. 30, 2002    (JP) ............................ 2002-252323

(51) Int. Cl.
*B60K 31/00*    (2006.01)
(52) U.S. Cl. ........................ 180/170; 701/93
(58) Field of Classification Search ............... 180/169, 180/170, 167, 178, 179; 364/461, 424.044, 364/426.04, 424.05
See application file for complete search history.

(56) References Cited

U.S. PATENT DOCUMENTS

| | | | |
|---|---|---|---|
| 4,605,885 A * | 8/1986 | Mitsuhashi ................. 388/823 |
| 5,003,482 A * | 3/1991 | Teratani et al. ............... 701/95 |
| 5,189,618 A * | 2/1993 | Tsujii et al. .................... 701/93 |
| 5,235,512 A * | 8/1993 | Winkelman et al. .......... 701/93 |
| 5,329,454 A * | 7/1994 | Takada et al. ................. 701/95 |
| 5,695,020 A * | 12/1997 | Nishimura ................... 180/169 |
| 5,758,306 A * | 5/1998 | Nakamura .................... 701/93 |
| 6,021,370 A * | 2/2000 | Bellinger et al. ........... 701/110 |
| 6,104,976 A * | 8/2000 | Nakamura ................... 701/95 |
| 6,278,928 B1 * | 8/2001 | Aruga et al. ................... 701/65 |
| 6,311,117 B1 * | 10/2001 | Winner et al. ................ 701/93 |
| 6,370,470 B1 * | 4/2002 | Yamamura et al. ........... 701/96 |
| 6,459,982 B1 * | 10/2002 | Kobayashi et al. ........... 701/93 |
| 6,516,262 B2 * | 2/2003 | Takenaga et al. ............. 701/96 |
| 6,574,543 B2 * | 6/2003 | Ikeda ........................... 701/95 |
| 6,609,378 B2 * | 8/2003 | Scott ........................... 60/773 |
| 6,902,021 B2 * | 6/2005 | Kikuchi et al. ............. 180/170 |

FOREIGN PATENT DOCUMENTS

| | | |
|---|---|---|
| JP | 10053046 A | 2/1998 |
| JP | 11034695 A | 2/1999 |

OTHER PUBLICATIONS

Japanese Office Action dated Aug. 8, 2006 with English translation (Four (4) pages).

* cited by examiner

*Primary Examiner*—Christopher P. Ellis
*Assistant Examiner*—Vaughn Coolman
(74) *Attorney, Agent, or Firm*—Crowell & Moring LLP (57) ABSTRACT

A maximum permissible acceleration is calculated so as to take into account vehicle stability, driver's comfort, road surface information and traffic information, driver's specific taste in acceleration and deceleration, and the like. An acceleration limiting process is carried out, in which a feedback gain in vehicle speed feedback control is corrected as may be necessary based on a relationship between the maximum permissible acceleration and actual acceleration information so as to keep the actual acceleration within the maximum permissible acceleration. The present invention thereby makes it possible to control a vehicle speed within a desired acceleration range even under conditions, in which there is a large vehicle speed deviation as in a resume mode, causing an excessively large acceleration or deceleration to tend to occur. Auto cruise control offering an outstanding safety and comfort can thus be implemented.

4 Claims, 12 Drawing Sheets

VEHICLE CRUISE CONTROL DEVICE AND METHOD

BACKGROUND OF THE INVENTION

The present invention relates to a control device that performs cruise control for an automotive vehicle so as to allow a set target vehicle speed to coincide with an actual vehicle speed and a control method for the same.

Japanese Patent Laid-open No. Hei 10-53046 discloses a technique that is concerned with a resume operation. Specifically, after an auto cruise control is temporarily interrupted by a driver's operating a brake or the like to reduce a vehicle speed of a host vehicle, the driver operates a resume switch to restore the vehicle speed to a target vehicle speed or a stored vehicle speed immediately before the auto cruise control has been interrupted. The technique disclosed in Japanese Patent Laid-open No. Hei 10-53046 does not use the stored vehicle speed as a target vehicle speed for vehicle speed feedback control in the resume mode. Rather, it sets an actual vehicle speed developing when the resume operation is started as the target vehicle speed for the vehicle speed feedback control, thereby bringing the target vehicle speed gradually to the stored vehicle speed.

Japanese Patent Laid-open No. Hei 11-34695 refers to acceleration feedback control during acceleration of a vehicle. It is intended for improving the response of a throttle.

According to Japanese Patent Laid-open No. Hei 10-53046, if a vehicle speed feedback gain is set appropriately so as to allow the actual vehicle speed to properly follow the target vehicle speed, it is possible to minimize a vehicle speed deviation at all times. This is effective in preventing acceleration from becoming excessively large. If the feedback gain is made inappropriate as caused by a road gradient, a wind velocity, or other disturbance, however, the actual vehicle speed becomes unable to follow the target vehicle speed, thus making large the vehicle speed deviation. In such a case, a vehicle speed feedback control device acts to make small the vehicle speed deviation. This presents a problem, in which a vehicle acceleration becomes excessively large as a result of an engine torque changing by a large margin.

Japanese Patent Laid-open No. Hei 11-34695 refers to the acceleration feedback control during the acceleration of a vehicle. It is intended for improving throttle response, not concerned with driver's comfort or vehicle stability.

Accordingly, there is a challenge that must be addressed, in which excessive acceleration and deceleration should be prevented under all possible conditions.

SUMMARY OF THE INVENTION

It is therefore an object of the present invention to provide auto cruise control that offers outstanding safety and comfort by optimally controlling vehicle acceleration even under a condition, in which there developing a large vehicle speed deviation as in the resume mode, causing excessive acceleration or deceleration to occur.

In order to address the problem described above, according to a first aspect of the present invention, an acceleration limiting process is carried out. The acceleration limiting process is specifically carried out as follows. A maximum permissible acceleration is calculated so as to take into account a driver's intention, a running environment, and the like. An actual acceleration is then controlled so that it is kept within this maximum permissible acceleration and a feedback gain during the vehicle speed feedback control is corrected.

According to a second aspect of the present invention, a vehicle cruise control is provided by appropriately selecting the vehicle speed feedback control that uses a target vehicle speed or the acceleration feedback control that uses a target acceleration according to a deviation between the target vehicle speed and the actual vehicle speed.

Devices have conventionally been put into practical use, in which a throttle opening is controlled so as to eliminate any deviation between the target vehicle speed and the actual vehicle speed, thus enabling vehicles to keep cruising speeds set by drivers. Such devices are generically called an auto cruise or cruise control.

This cruise control technique has been further developed into an adaptive cruise control, or ACC, that provides a constant vehicle speed control when there is no preceding vehicle running in front of a host vehicle and a headway control when there is a preceding vehicle so as to keep a constant headway distance from the preceding vehicle.

In auto cruise, feedback control is employed for the constant vehicle speed control. According to an ordinary vehicle speed feedback control, the greater the difference between the target vehicle speed and the actual vehicle speed (hereinafter referred to as a "vehicle speed deviation"), the greater the change in the throttle opening that represents a control variable. If the vehicle speed deviation is large, the engine torque greatly changes. This makes the vehicle acceleration excessively large, giving the driver a sense of uneasiness. In addition, on rainy or snowy days, it causes a driving wheel to tend to slip, which is dangerous.

Conditions, in which the vehicle speed deviation becomes large during the auto cruise control, include the following. That is, the driver changes the target vehicle speed using switches of various sorts; the driver operates an accelerator pedal to attempt passing, resulting in the vehicle speed being increased; a large disturbance affecting the vehicle speed occurs, including when the vehicle ascends or descends a steep uphill or downhill road and when the vehicle receives a strong head wind.

Figure 2:
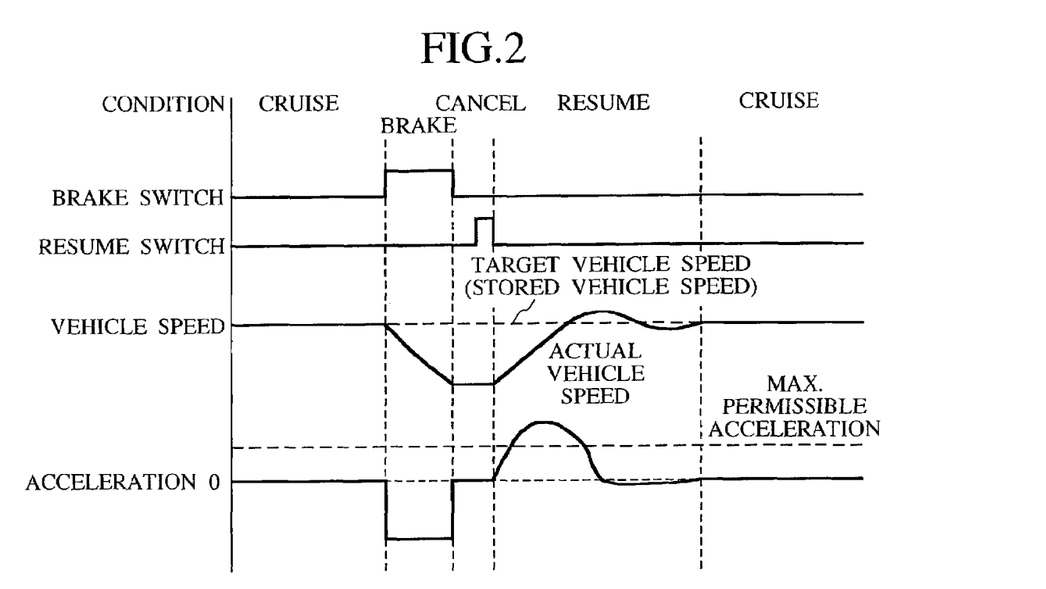
FIG. 2 is a diagram illustrating control states in a resume mode.

A typical factor that makes the vehicle speed deviation greater is a resume operation performed by the driver. The resume operation is typically depicted in FIG. 2. Specifically, after the driver has performed a braking operation or the like to interrupt the auto cruise control, thereby causing the speed of a host vehicle to be reduced, the driver operates a resume switch in an attempt to restore the speed to the target vehicle speed (a stored vehicle speed) immediately before the auto cruise control has last been interrupted. As shown in FIG. 2, the vehicle speed deviation becomes great at a timing immediately after the resume switch is operated. At this timing, hard acceleration tends to occur with the ordinary vehicle speed feedback control.

Figure 3:
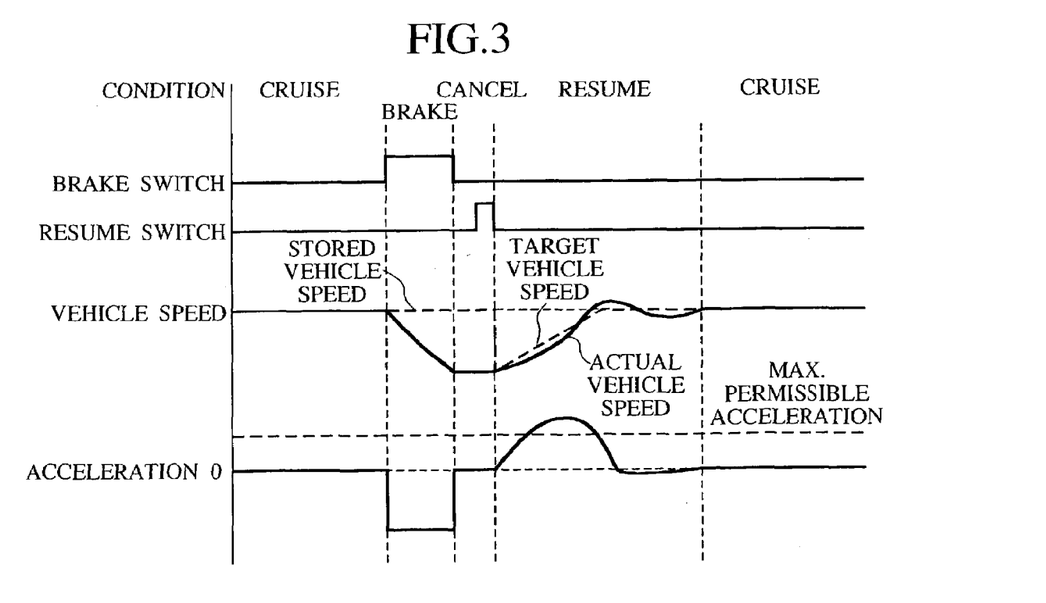
FIG. 3 is another diagram illustrating control states in a resume mode.

A prior art to solve this problem is disclosed in Japanese Patent Laid-open No. Hei 10-53046. The technique disclosed in Japanese Patent Laid-open No. Hei 10-53046 does not use the stored vehicle speed as the target vehicle speed for vehicle speed feedback control in the resume mode, as shown in FIG. 3. Rather, the technique sets the actual vehicle speed developing when the resume operation is started as the target vehicle speed for the vehicle speed feedback control, thereby bringing the target vehicle speed gradually to the stored vehicle speed. This allows the vehicle speed deviation to be kept small at all times, thus effectively preventing acceleration from becoming excessively large. The vehicle acceleration during this resume range is variable using increments of the target vehicle speed per unit time when the target vehicle speed is brought to the stored vehicle speed.

According to Japanese Patent Laid-open No. Hei 10-53046, if the vehicle speed feedback gain is set appropriately so as to allow the actual vehicle speed to properly follow the target vehicle speed, it is possible to keep the vehicle speed deviation small at all times. This is effective in preventing acceleration from becoming excessively large. If, however, the feedback gain is made inappropriate as caused by a road inclination, a wind velocity, or other disturbance, the actual vehicle speed becomes unable to follow the target vehicle speed, thus making large the vehicle speed deviation, as shown in FIG. 3. In such a case, the vehicle speed feedback control device acts to make small the vehicle speed deviation. This gives rise to a problem, in which the vehicle acceleration becomes excessively large as a result of the engine torque changing by a large margin. To prevent excessive acceleration or deceleration under all possible conditions, therefore, it becomes necessary to control the acceleration itself based on actual acceleration information. More specifically, when the actual acceleration exceeds a predetermined acceleration level, it is considered effective to carry out a limiting process that limits the control variable, such as a throttle opening or the like. Alternatively, it is possible to provide acceleration feedback control based on the deviation between a target acceleration, which has been set during a period of acceleration, and the actual acceleration. Japanese Patent Laid-open No. Hei 11-34695 discloses a technique involving the acceleration feedback control. The Japanese Patent Laid-open No. Hei 11-34695 refers to an acceleration feedback control during acceleration performed by an ACC. The technique is intended for improving throttle response, but not concerned with driver's comfort or vehicle stability.

The object of the present invention is to provide auto cruise control that offers outstanding safety and comfort by optimally controlling vehicle acceleration even under a condition, in which there developing a large vehicle speed deviation as in the resume mode, causing excessive acceleration or deceleration to occur.

According to preferred embodiments of the present invention, a maximum permissible acceleration is calculated so as to take into account vehicle stability, driver's comfort, road surface information and traffic information, driver's specific taste in acceleration and deceleration, and the like. The acceleration limiting process is carried out, in which the feedback gain in the vehicle speed feedback control is corrected as may be necessary based on the relationship between the maximum permissible acceleration and the actual acceleration information so as to keep the actual acceleration within the maximum permissible acceleration.

Likewise, the target acceleration during the period of acceleration is calculated by taking into account vehicle stability, driver's comfort, road surface information and traffic information, driver's specific taste in acceleration and deceleration, and the like. A vehicle cruise control is provided by selecting the acceleration feedback control that uses the target acceleration, as switched from the vehicle speed feedback control, when the deviation between the target vehicle speed and the actual vehicle speed is great as in the resume mode and performing calculations of the throttle opening and the like.

BRIEF DESCRIPTION OF THE DRAWINGS

Other objects and advantages of the invention will become apparent from the following description of embodiments with reference to the accompanying drawings in which.

DETAILED DESCRIPTION OF THE PREFERRED EMBODIMENTS

Figure 4:
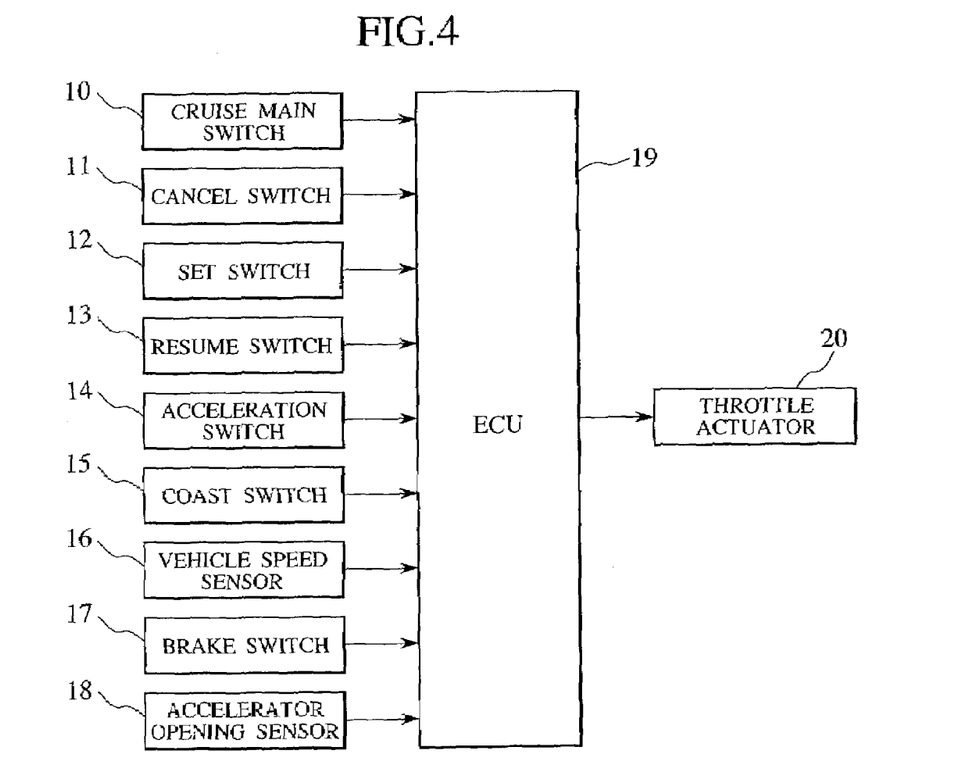
FIG. 4 is a system schematic diagram of a vehicle speed control device according to the first embodiment of the present invention.

Preferred embodiments according to the present invention will be described. A first embodiment of the present invention will be described in details with reference to the accompanying drawings. FIG. 4 is a system schematic diagram showing a vehicle speed control device according to the first embodiment. An ECU 19 is a device that executes control of various kinds including an auto cruise control. It is provided with a CPU that performs calculations required for engine control, a ROM that stores therein a program and a variety of constants, a RAM that temporarily stores information required for calculations, an A/D converter and a D/A converter used as interfaces with external devices, and the like.

Inputs as they relate to the auto cruise are applied to the ECU from various switches and sensors that include the following. That is, ON/OFF information of auto cruise switches of various kinds mounted on a steering wheel, a dashboard, and the like—for example, a cruise main switch 10, a cancel switch 11, a set switch 12, a resume switch 13, an accelerator switch 14, a coast switch 15, and the like; vehicle speed information provided by a vehicle speed sensor 16; outputs from a brake switch (sensor) 17, an accelerator opening sensor 18, and the like, as they relate to acceleration or deceleration operation performed by the driver. Based on these pieces of input information, the ECU 19 calculates a target throttle opening that is appropriate for the current condition and provides an output to a throttle actuator 20. The throttle actuator 20 controls the throttle opening based on this output signal, controlling the amount of intake air of the engine and eventually the output of the engine, thereby providing required auto cruise control.

Figure 5:
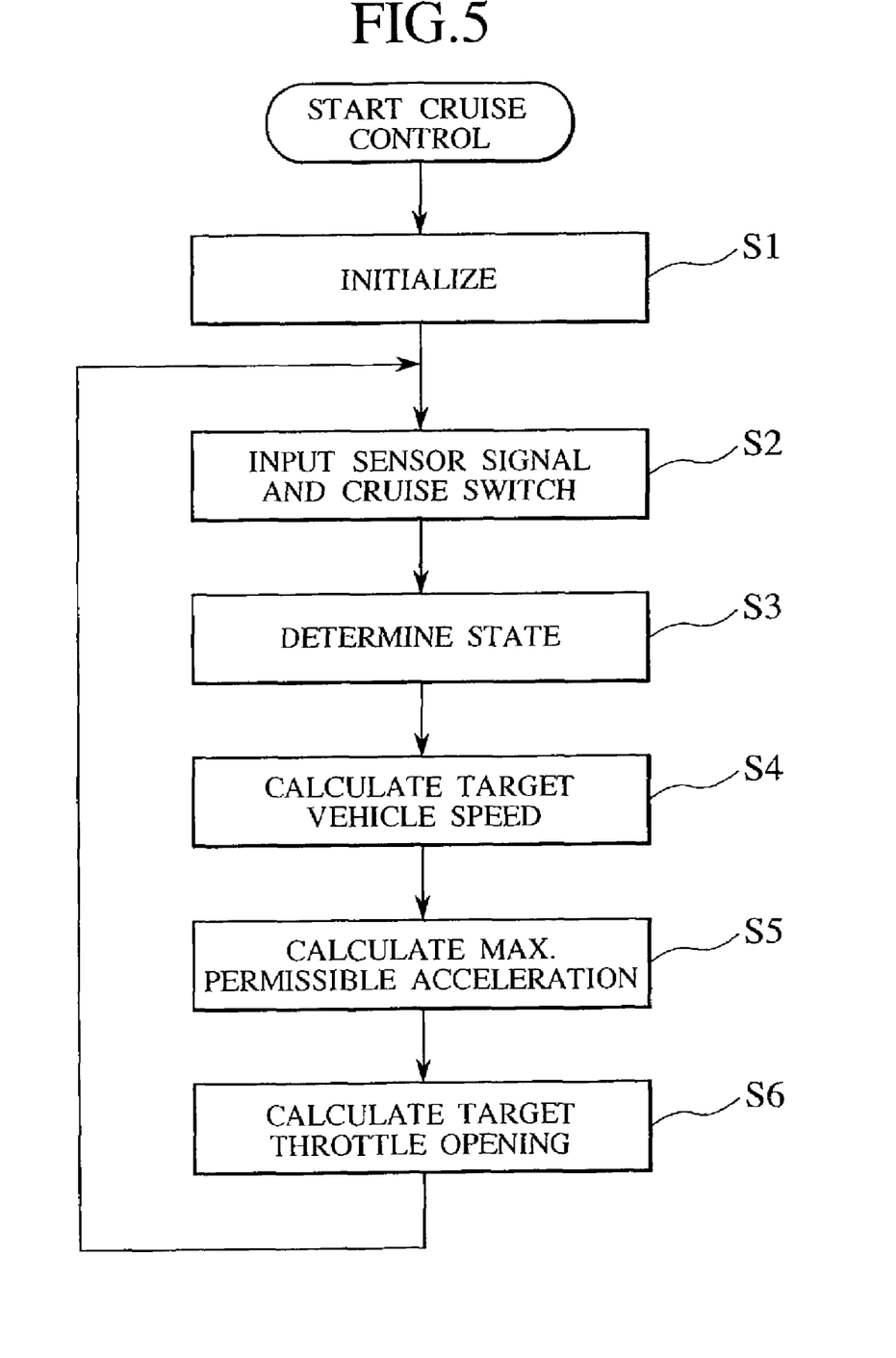
FIG. 5 is a flow diagram of cruise control according to the first embodiment of the present invention.

A control flow of the auto cruise control will be described with reference to the flowchart shown in FIG. 5. In step S1, variables of various types relating to the auto cruise control are initialized. In step S2, inputs from sensors and cruise-related switches are processed. In step S3, states (conditions) in the cruise control are determined based on these pieces of input information. The states include, for example, a cruise control disabled state, a cruise control enabled state, a vehicle speed set state, a vehicle speed feedback state, an accelerated state, a decelerated state, a resume state, and the like. In step S4, a target vehicle speed is calculated based on the decision made as to the states in step S3. In step S5, maximum permissible acceleration is calculated in accordance with changing conditions during execution of the cruise control. In step S6, a target throttle opening is calculated based on the actual vehicle speed input in step S2, the target vehicle speed calculated in step S4, and the maximum permissible acceleration calculated in step S5. The control thereafter returns to step S2 and the calculations of S2→S6→S2 are repeated until the cruise control is completed.

Figure 1:
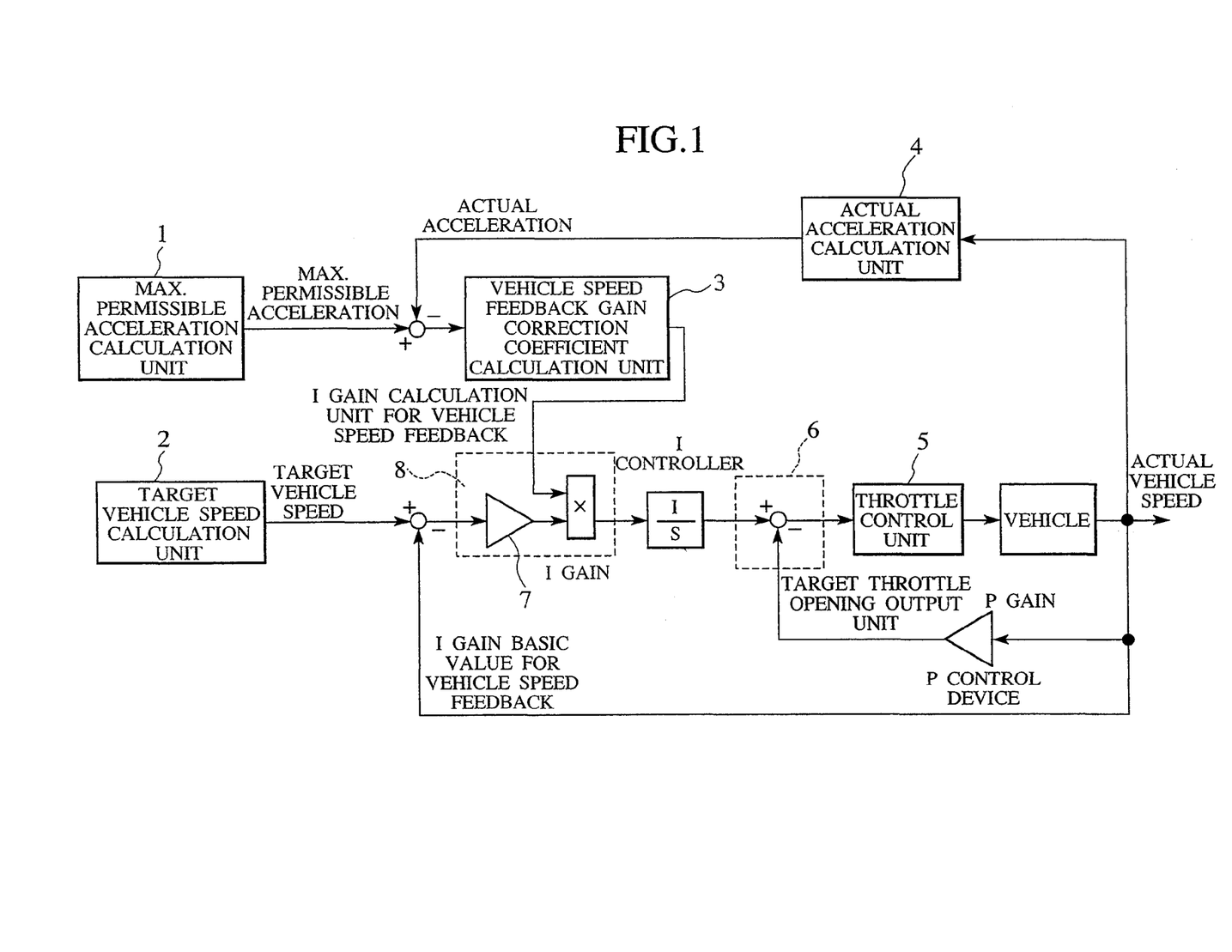
FIG. 1 is a control block diagram of target throttle opening calculation according to a first embodiment of the present invention.
Figure 6:
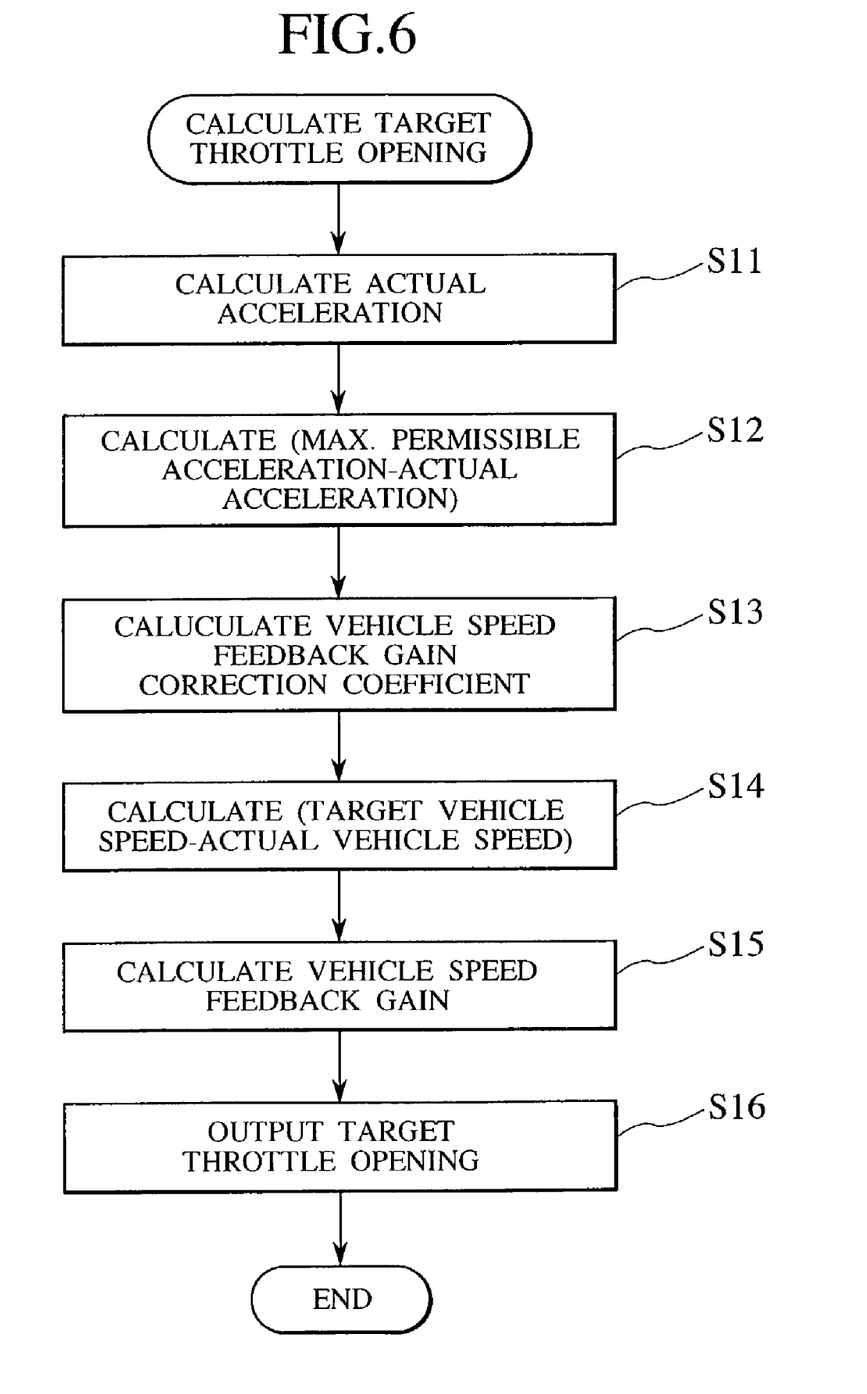
FIG. 6 is a flow diagram of control using a feedback gain according to the first embodiment of the present invention.

The calculation of the target throttle opening will be described in detail with reference to FIGS. 1 and 6. FIG. 1 is a control block diagram for calculation of the target throttle opening according to the present invention. The so-called I-P controller is used as a vehicle speed feedback control device in this control block. What is unique about the control device according to the preferred embodiments of the present invention is that I gain of the I controller is variable according to actual vehicle speed information.

Figure 7:
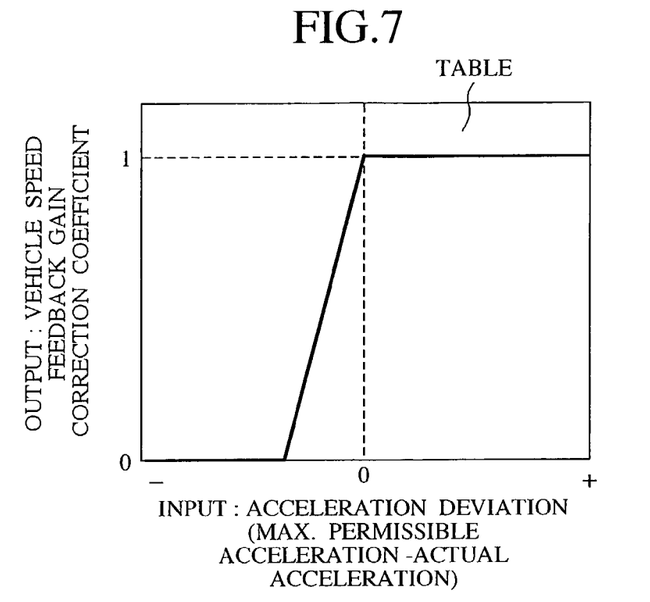
FIG. 7 shows a relationship between an acceleration deviation and a coefficient of correction of a vehicle speed feedback gain according to the first embodiment of the present invention.

Specific controls provided by the control device will be described with reference to the control flow shown in FIG. 6. In step S11 of the control flow shown in FIG. 6, Actual acceleration is calculated based on information provided by the vehicle speed sensor. An actual acceleration calculation unit 4 shown in FIG. 1 performs this calculation. Specifically, the calculation unit 4 differentiates the vehicle speed with respect to time. Filtering may also be performed for noise prevention. In step S12 in the control flow shown in FIG. 6, a deviation between the maximum permissible acceleration and the actual acceleration is calculated. A maximum permissible acceleration calculation unit 1 shown in FIG. 1 performs the calculation of the maximum permissible acceleration. Specific details of the calculation will be described later. In step S13 of the control flow shown in FIG. 6, an I gain correction coefficient for vehicle speed feedback is calculated based on the acceleration deviation calculated in step S12. A vehicle speed feedback gain correction coefficient calculation unit 3 shown in FIG. 1 performs the calculation of the I gain correction coefficient for vehicle speed feedback. A basic logic will be described with reference to FIG. 7. The calculation is done through table search. If the input acceleration deviation is positive, that is, if the actual acceleration is smaller than the maximum permissible acceleration, the correction coefficient is calculated as 1. If the acceleration deviation is negative, a value of more than 0 and less than 1 is calculated according to the specific deviation value. In this case, the greater the deviation, the closer the value is to 0. The foregoing descriptions assume that the vehicle is being accelerated as in the resume mode. For a timing of deceleration, the contents of the table are symmetrical with respect to those shown in FIG. 7. Referring back to the control flow shown in FIG. 6, in step S14, a deviation between the target vehicle speed and the actual vehicle speed is calculated. In step S15 of the control flow shown in FIG. 6, the I gain of the I controller is calculated. An I gain calculation unit for vehicle speed feedback 8 shown in FIG. 1 performs this calculation. Specifically, an I gain basic value for vehicle speed feedback 7 is multiplied by the I gain correction coefficient for vehicle speed feedback calculated in step S13. Finally in step S16 of the control flow shown in FIG. 6, a target throttle opening to be output to the throttle actuator is calculated. A target throttle opening output unit 6 shown in FIG. 1 performs this calculation based on the I controller and P controller.

The I gain for vehicle speed feedback will be explained. According to the I gain correction coefficient for vehicle speed feedback calculated, if the actual acceleration is smaller than the maximum permissible acceleration, an output of the I gain basic value for vehicle speed feedback is directly produced. If the actual acceleration is greater than the maximum permissible acceleration, on the other hand, an output is produced with the I gain basic value for vehicle speed feedback being subtracted or becoming 0. That is, if the actual acceleration is smaller than the maximum permissible acceleration, an ordinary I (integral) control is provided. If the actual acceleration is greater than the maximum permissible acceleration, on the other hand, action of the I control is decreased, or I control is temporarily inactive. That is, logic of the I gain correction coefficient for vehicle speed feedback is added to a common I-P controller used as the vehicle speed feedback control device. Through this arrangement, a limiting process governing the throttle opening as a control variable, or a limiting process governing the engine torque and vehicle acceleration, is performed if the actual acceleration is greater than the maximum permissible acceleration.

Figure 8:
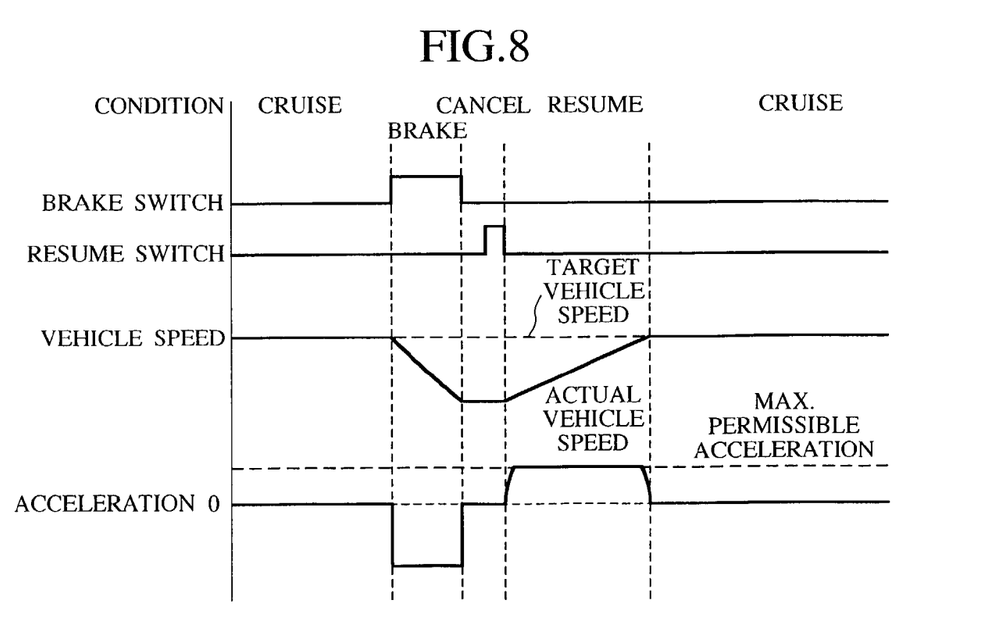
FIG. 8 is a diagram illustrating control states according to the first embodiment of the present invention.

FIG. 8 shows results of control provided by the preferred embodiments of the present invention. When the acceleration approaches the maximum permissible acceleration, an increase in acceleration is suppressed by an acceleration limiting effect produced by the I controller. It then becomes possible to control the acceleration so as to keep the same within a desired range of acceleration.

Figure 9:
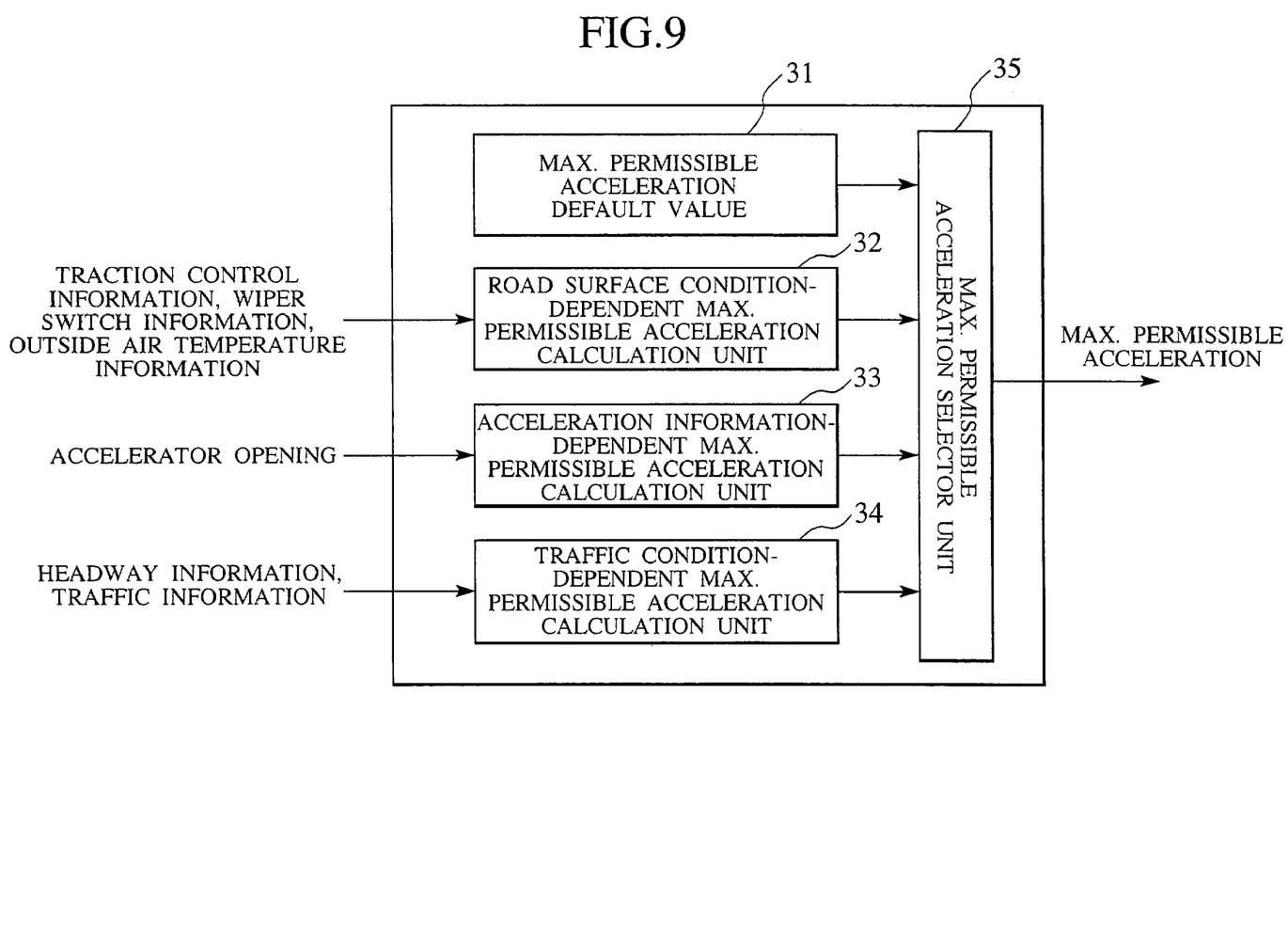
FIG. 9 is a block diagram of a maximum permissible acceleration calculation unit according to the first embodiment of the present invention.

The maximum permissible acceleration calculation unit 1 will be described in detail with reference to FIG. 9. A maximum permissible acceleration default value 31, which is considered appropriate in consideration of vehicle stability or driver's comfort, is set in the maximum permissible acceleration calculation unit 1. The value can be varied according to conditions. If, for example, the road surface is wet or frozen, it is desirable that the maximum permissible acceleration be smaller than in ordinary conditions from the standpoint of safety. A road surface condition-dependent maximum permissible acceleration calculation unit 32 therefore uses information, which indirectly tells road surface conditions, provided by a wiper switch, an outside air temperature gauge, and traction control to estimate the road surface condition. The calculation unit 32 thereby calculates an even more appropriate maximum permissible acceleration. In addition, each individual driver has his or her own absolute value representing a permissible level of acceleration or deceleration. There are some who opt for even milder acceleration. To respond to this requirement, an acceleration information-dependent maximum permissible acceleration calculation unit 33 calculates a maximum permissible acceleration value. This value represents a specific taste for acceleration or deceleration of the driver, as judged based on a value learned through information relating to accelerator operation provided by the accelerator opening sensor. A traffic condition-dependent maximum permissible acceleration calculation unit 34 reads information from a headway distance sensor and traffic information to calculate the maximum permissible acceleration in accordance with a traffic condition that varies constantly. A maximum permissible acceleration selector unit 35 considers priority of these inputs and selects and produces an output of an optimum maximum permissible acceleration.

According to the first embodiment of the present invention explained in the foregoing description, the acceleration limiting process is performed by adding the vehicle speed feedback gain correction coefficient calculation unit to the vehicle speed feedback control device working through the ordinary I-P control. A common limiting process is, on the other hand, also possible, including, for example, a method of holding the throttle opening if the actual acceleration exceeds the maximum permissible acceleration. According to this method, however, the calculation of the control variable for feedback control is continued even during the limiting process. If the I controller is being used, therefore, a problem arises, in which the control variable output by the I controller keeps on increasing. To solve this problem, a measure that halts feedback during the limiting process becomes necessary.

According to the first embodiment of the present invention, an acceleration limiting effect is obtained from correcting the vehicle speed feedback gain. This eliminates the need for the process to suspend the feedback control as mentioned above. Furthermore, it is possible to make milder the change of the control variable through a process of reaching the acceleration limiting operation according to the setting made of the table value for calculating the vehicle speed feedback gain correction coefficient shown in FIG. 7. This is beneficial in terms of riding comfort.

As a measure for preventing excessively large acceleration, on the other hand, the following configuration, though rather complicated, is possible. That is, both the vehicle speed feedback control device and the acceleration feedback control device are provided. When the deviation between the target vehicle speed and the actual vehicle speed is large, as in the resume mode, a means is possible that switches from the vehicle speed feedback control to the acceleration feedback control using the target acceleration. A second preferred embodiment of the present invention, in which this means is applied, will be described with reference to accompanying drawings.

Figure 10:
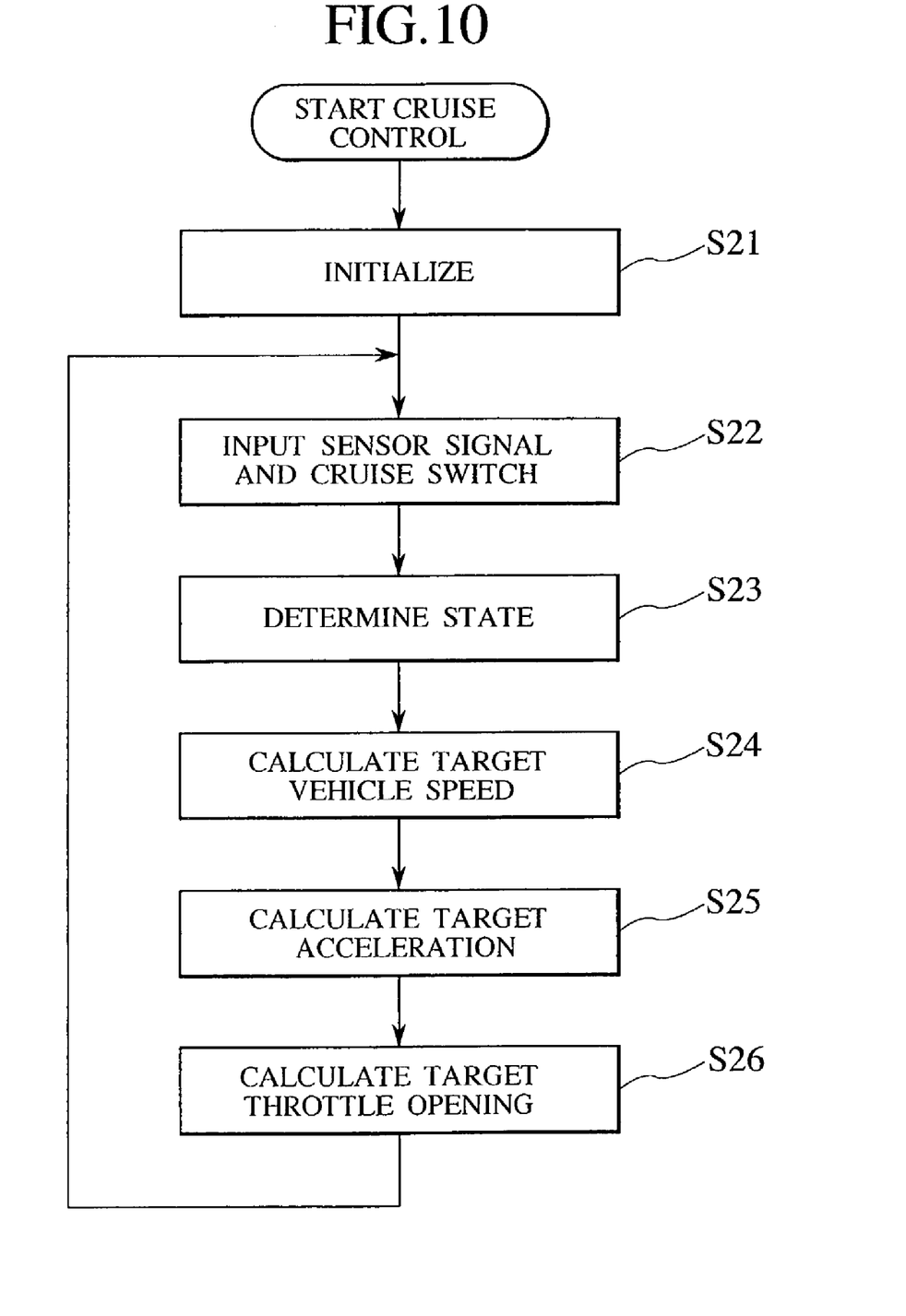
FIG. 10 is a flow diagram of cruise control according to a second embodiment of the present invention.

The control flow of the auto cruise control will be described with reference to the flowchart shown in FIG. 10. In step S21, variables of various types relating to the auto cruise control are initialized. In step S22, inputs from sensors and cruise-related switches are processed. In step S23, states (conditions) in the cruise control are determined based on these pieces of input information. The states include, for example, a cruise control disabled state, a cruise control enabled state, a vehicle speed set state, a vehicle speed feedback state, an accelerated state, a decelerated state, a resume state, and the like. In step S24, a target vehicle speed is calculated based on the decision made as to the states in step S23. In step S25, a target acceleration in accordance with changing conditions during execution of the cruise control is calculated. In step S26, a target throttle opening is calculated based on the actual vehicle speed input in step S22 and the actual acceleration calculated from the actual vehicle speed, the target vehicle speed calculated in step S24, and the target acceleration calculated in step S25. Specific details of the calculation vary depending on the deviation between the target vehicle speed and the actual vehicle speed. When the deviation between the target vehicle speed and the actual vehicle speed is small, the target throttle opening is calculated according to the vehicle speed feedback control. When the deviation between the target vehicle speed and the actual vehicle speed is large, as in the resume mode, the target throttle opening is calculated according to the acceleration feedback control. The target throttle opening calculation unit will be detailed later. The control thereafter returns to step S22 and the calculations of S22→S26→S22 are repeated until the cruise control is completed.

Figure 11:
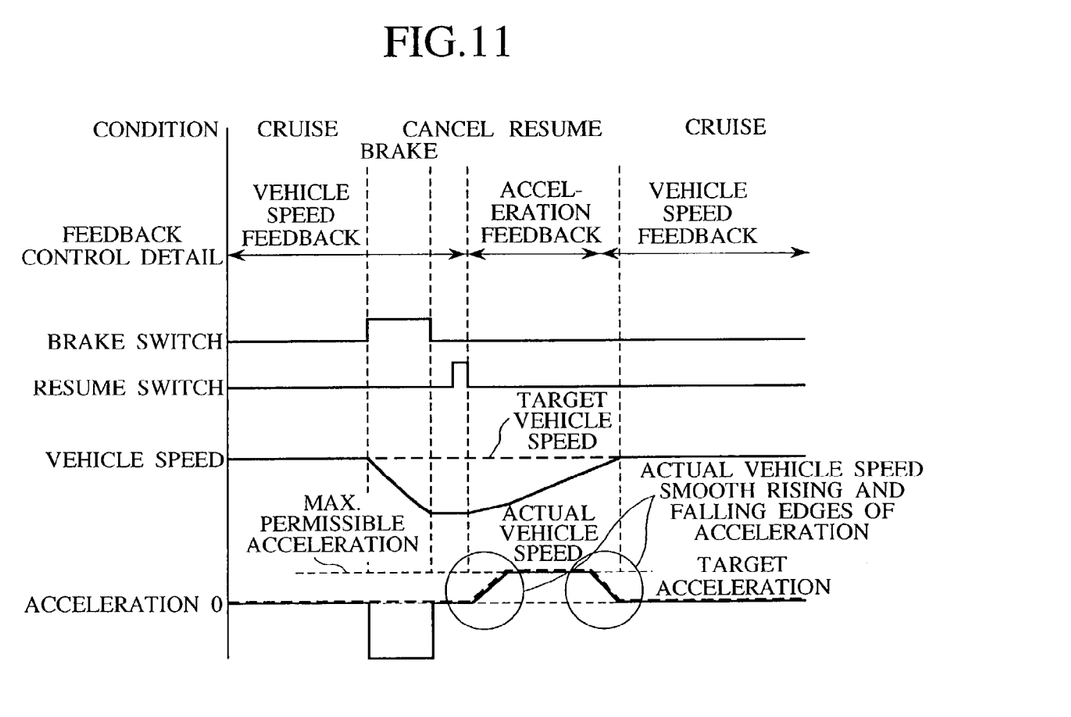
FIG. 11 is a diagram illustrating control states according to the second embodiment of the present invention.

Performing the acceleration feedback control while the vehicle is being accelerated as in the second embodiment of the present invention enhances driver's comfort even further as compared with the acceleration limiting control method as embodied in the first embodiment of the present invention. Details of this effect will be explained with reference to FIG. 11. Referring to FIG. 11, the target acceleration remains 0 during the vehicle speed feedback period. During the acceleration feedback period, on the other hand, the acceleration is set to the maximum permissible acceleration calculated in consideration of driver's comfort, vehicle stability, and the like, in the same manner as in the first embodiment of the present invention. If the target acceleration is changed in a stepwise fashion, however, sudden torque fluctuations could occur because of an effect from acceleration feedback. According to the second embodiment of the present invention, therefore, the target acceleration is set to form a lamp shape so as to change smoothly in the beginnings and ending of the acceleration feedback period. By adjusting this setting, it is possible to obtain even smoother acceleration in the resume mode than conventional techniques.

Figure 12:
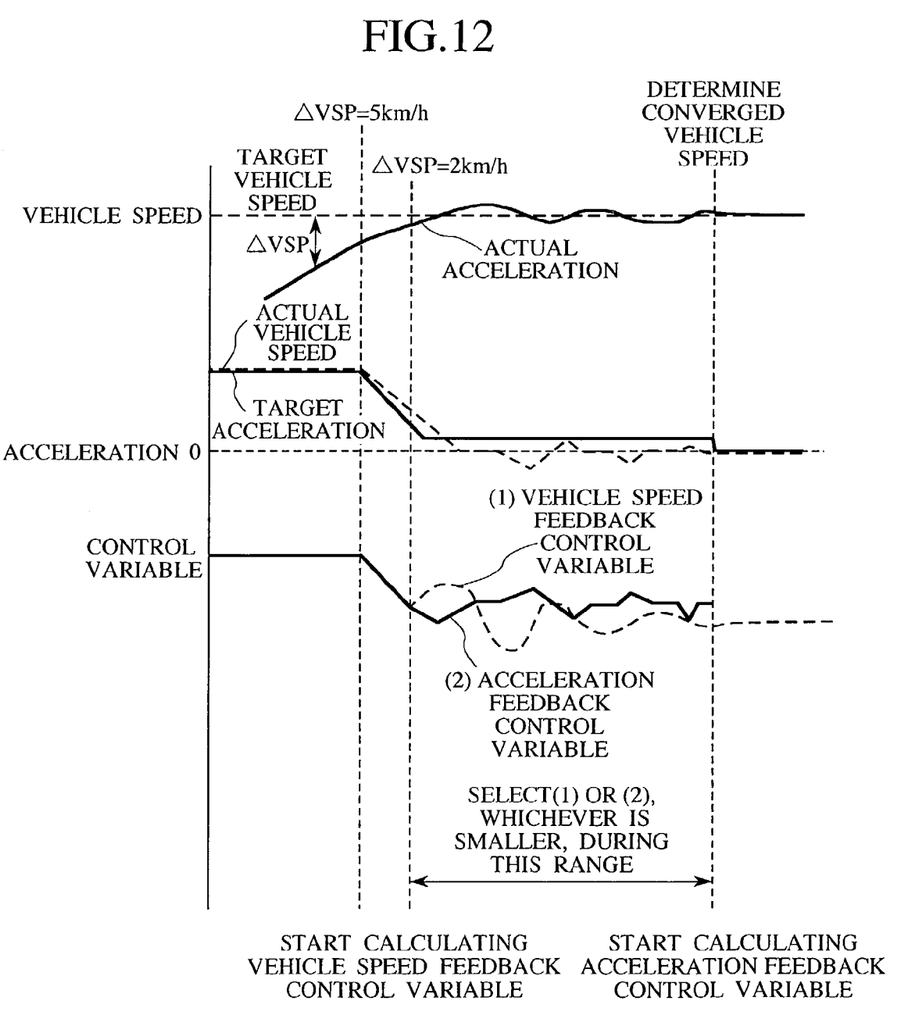
FIG. 12 is a diagram showing states of selecting between a vehicle speed feedback control and an acceleration feedback control, according to the second embodiment of the invention.

A logic for selecting the vehicle speed feedback control or the acceleration feedback control will be described with reference to FIG. 12. FIG. 12 shows a condition, in which the acceleration feedback control is switched to the vehicle speed feedback control in the resume mode. The deviation between the target vehicle speed and the actual vehicle speed is used as an index for a trigger for each calculation sequence during the switching. When the vehicle speed deviation becomes 5 km/h, the target acceleration is decreased in the lamp form to a setting value slightly greater than 0 km/h/sec in order to improve the riding comfort. When the vehicle speed deviation becomes 2 km/h, the calculation of the vehicle speed feedback control variable is started. At this time, considering a control variable selector logic to be described later, the smaller the difference between the vehicle speed feedback control variable and the acceleration feedback control variable, the faster the switching time. The control variables are therefore adjusted as detailed in the following only for the beginnings of the calculation. That is, an adequate value is substituted for an initial value (an integrated value) of the I controller for vehicle speed feedback to be described later so that the initial value of calculation of the vehicle speed feedback control variable becomes substantially equal to the acceleration feedback control variable. When the target vehicle speed substantially coincides with the actual vehicle speed, the vehicle speed feedback control variable becomes substantially a constant value. The acceleration feedback control variable will be, on the other hand, on an increasing trend, since the target acceleration is a value slightly greater than 0 km/h/sec as described earlier. The following therefore holds true eventually:

Acceleration feedback control variable>Vehicle speed feedback control variable

Based on this relationship, the control variable to be finally output is the vehicle speed feedback control variable or the acceleration feedback control variable, whichever is smaller (select low) as found through comparison made between the two. Adopting this logic enables smooth switching, without allowing any step in the control variable to be produced upon switching. When the deviation between the target vehicle speed and the actual vehicle speed thereafter becomes a predetermined value or less, a decision is made as to convergence of the vehicle speed. The acceleration feedback calculation is then terminated with only the vehicle speed feedback calculation kept enabled. The switching logic is then completed.

Figure 13:
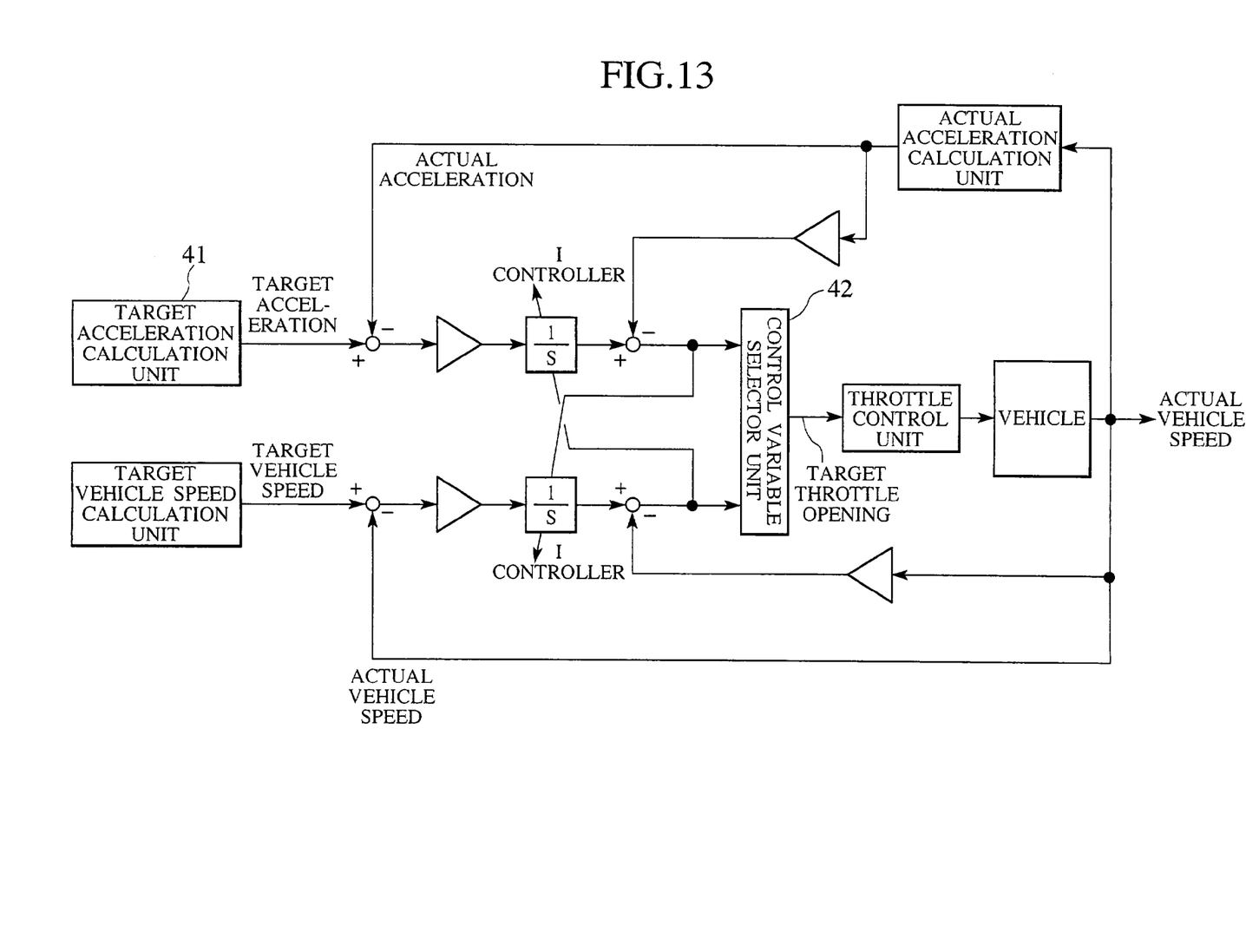
FIG. 13 is a control block diagram according to the second embodiment of the present invention.
Figure 14:
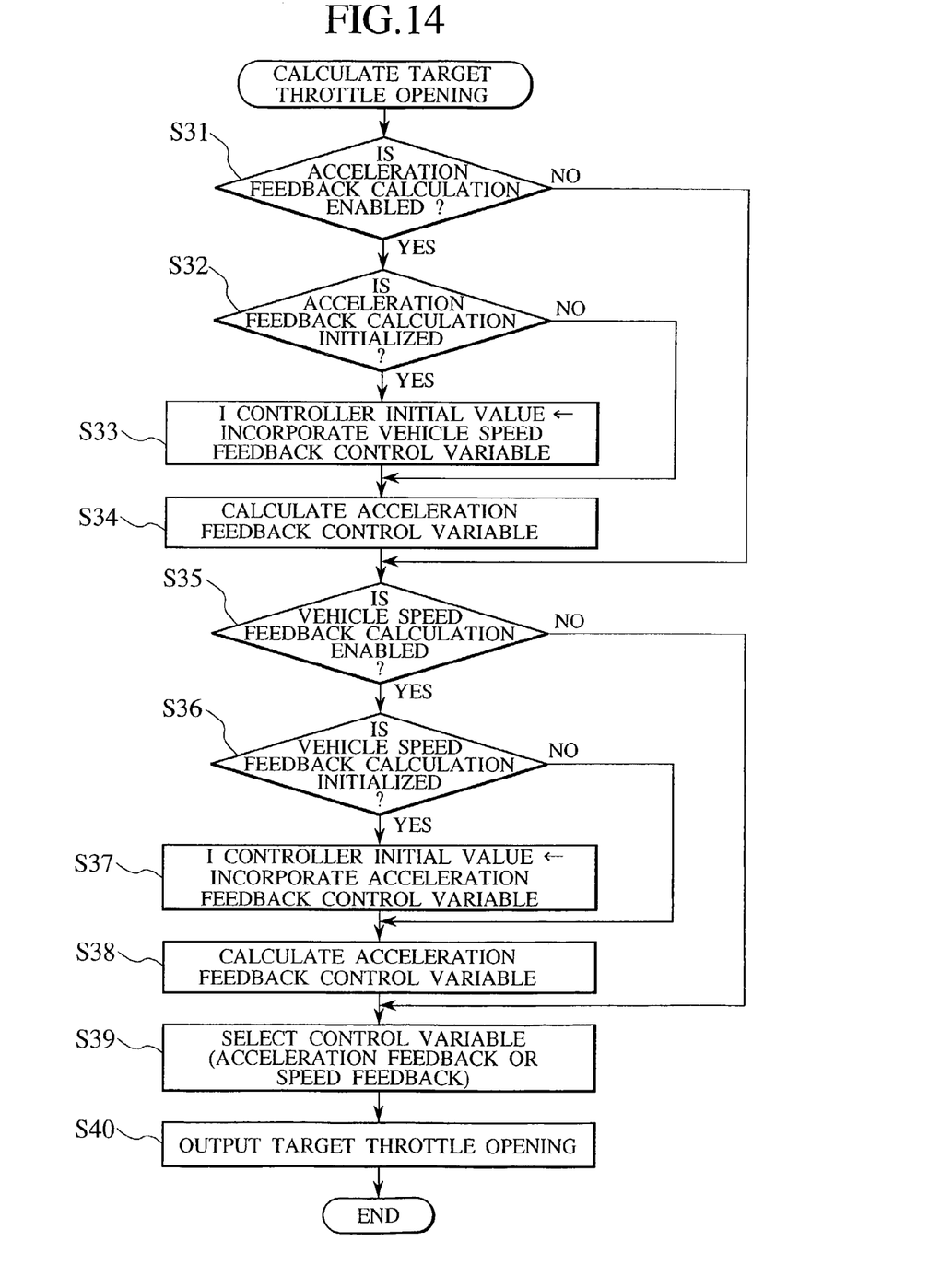
FIG. 14 is a control flow diagram according to the second embodiment of the present invention.

FIGS. 13 and 14 show a control block diagram and a control flow, respectively, for the target throttle opening calculation unit employed to embody the foregoing logic.

FIG. 13 shows the control block diagram for calculation of the target throttle opening. This control block is characterized in that both a vehicle speed feedback controller and an acceleration feedback controller are both provided as I-P controllers. Further, a control variable selector unit selects either the vehicle speed feedback control variable or the acceleration feedback control variable according to the switching logic explained with reference to FIG. 12. There is also provided a throttle control unit that uses these control variables for throttle opening control and, eventually, vehicle speed control. In addition, the information on the other control variable can be incorporated in each I controller. This allows the control variables to be adjusted in the beginnings of the feedback calculation as explained earlier using FIG. 12.

The control flow shown in FIG. 14 will be described. An overview of the control flow is as follows: Steps S31 through S34 are concerned with calculation of the acceleration feedback control variable; steps S35 through S38 are concerned with calculation of the vehicle speed feedback control variable; and steps S39 and S40 are for selecting the control variable and producing a final output, respectively.

In step S31, it is determined whether or not to enable the acceleration feedback calculation based on the states information and vehicle speed deviation information in the auto cruise control. If step S31 is answered No, the control proceeds to step S35 and, if step S31 is answered Yes, the control proceeds to step S32. In step S32, an initial decision is made of the acceleration feedback calculation. If step S32 is answered No, the control proceeds to step S34 and, if step S32 is answered Yes, the control proceeds to step S33. In step S33, the initial value of the I controller of the acceleration feedback control device is calculated based on the control variable of the vehicle speed feedback control. In step S34, the acceleration feedback control device performs calculation of the control variable.

In step S35, it is determined whether or not to enable the vehicle speed feedback calculation based on the states information and vehicle speed deviation information in the auto cruise control. If step S35 is answered No, the control proceeds to step S39 and, if step S35 is answered Yes, the control proceeds to step S36. In step S36, an initial decision is made of the vehicle speed feedback calculation. If step S36 is answered No, the control proceeds to step S38 and, if step S36 is answered Yes, the control proceeds to step S37.

In step S37, the initial value of the I controller of the vehicle speed feedback control device is calculated based on the control variable of the acceleration feedback control. In step S38, the vehicle speed feedback control device performs calculation of the control variable.

In step S39, either the control variable by the acceleration feedback control device calculated in step S34 or the control variable by the vehicle speed feedback control device calculated in step S38 is selected based on the states information and vehicle speed deviation information in the auto cruise control. An output of the final control variable is thereby produced. In step S40, the target throttle opening is calculated based on the control variable calculated in step S39 and sent to the throttle control unit.

In the second embodiment of the present invention explained in the foregoing descriptions, two control devices are necessary, one for vehicle speed feedback and the other for acceleration feedback. On top of that, the switching logic becomes complicated. Despite these drawbacks, the second embodiment of the present invention offers a benefit of permitting finely-tuned control in terms of acceleration during the auto cruise. This enhances driver's comfort even further.

As explained in the foregoing descriptions, according to the preferred embodiments of the present invention, it is possible to control the vehicle so as to keep within the maximum permissible acceleration even under conditions, in which there is a large vehicle speed deviation as in the resume mode, causing an excessively large acceleration or deceleration to tend to occur. An auto cruise control offering outstanding safety and comfort can thus be implemented.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A vehicle cruise control device for controlling a throttle opening in accordance with a vehicle speed deviation between a set target vehicle speed and an actual vehicle speed, wherein a reference acceleration is set in advance and, based on said reference acceleration and actual acceleration, a limiting process that limits vehicle acceleration by limiting said throttle opening is performed in calculation of the throttle opening;

wherein means is provided for calculating said reference acceleration based on driver's comfort and vehicle stability, road surface condition, information on the driver's accelerator operation, and traffic information, and means is provided for calculating said throttle opening including calculating a correction coefficient for a vehicle speed feedback gain based upon a deviation between said reference acceleration and said actual acceleration and calculating said vehicle speed feedback gain based on said vehicle speed deviation and said correction coefficient.

2. The vehicle cruise control device according to claim 1, wherein adjustment of the vehicle speed feedback gain is applied to a feedback gain of an integral controller.

3. A vehicle cruise control method, comprising the steps of:

inputting a sensor signal or a cruise control signal;
calculating a condition for a cruise control;
calculating a target vehicle speed based on said condition for the cruise control;

calculating a maximum permissible acceleration based on said cruise control condition;

calculating a target throttle opening based on said maximum permissible acceleration; and controlling a vehicle speed in accordance with said target throttle opening, based on a vehicle speed feedback gain;

wherein said target throttle opening is calculated by calculating an actual acceleration using said sensor signal, calculating a correction coefficient for said vehicle speed feedback gain based on an acceleration deviation between said maximum permissible acceleration and said actual acceleration, calculating a vehicle speed deviation between said target vehicle speed and said actual vehicle speed, and calculating said vehicle speed feedback gain based on said vehicle speed deviation and said correction coefficient.

4. A vehicle cruise control device, comprising:

means for inputting a sensor signal or a cruise control signal;

means for calculating a cruise control condition;

means for calculating a target vehicle speed based on said cruise control condition;

means for calculating a maximum permissible acceleration based on said cruise control condition;

means for calculating a target throttle opening based on said maximum permission acceleration;

means for controlling a vehicle speed in accordance with said target throttle opening based on a vehicle speed feedback gain;

wherein said target throttle opening is calculated by calculating an actual acceleration using said sensor signal, calculating a correction coefficient for said vehicle speed feedback gain based on an acceleration deviation between said maximum permissible acceleration and said actual acceleration; calculating a vehicle speed deviation between said target vehicle speed and said actual vehicle speed, and calculating said vehicle speed feedback gain based on said vehicle speed deviation and said correction coefficient.

* * * * *